United States Patent Office 3,767,654
Patented Oct. 23, 1973

3,767,654
THIAZINE- AND THIAZOLE-TRIAZOLES
Rudiger D. Haugwitz, Highland Park, and Venkatachala L. Narayanan, Hightstown, N.J., assignors to E. R. Squibb & Sons, Inc., Princeton, N.J.
No Drawing. Filed Sept. 7, 1971, Ser. No. 178,494
Int. Cl. C07d 93/06
U.S. Cl. 260—243 R    7 Claims

ABSTRACT OF THE DISCLOSURE

Triazole derivatives are provided having the structure

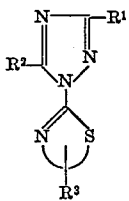

which are useful as anthelmintic agents.

---

The present invention relates to 1,2,4-triazole derivatives having the structure

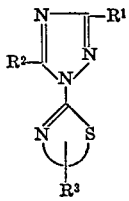

wherein $R^1$ and $R^2$ are the same or different and can be hydrogen, lower alkyl, aryl, aralkyl, lower alkyl thio, alkoxy- or aryloxycarbonyl $$(R^4O-\overset{O}{\underset{\|}{C}})$$

wherein $R^4$ is lower alkyl or aryl) or heterocyclic containing one, two or three heteroatoms such as N, O and/or S. The radical

is a 5- or 6-membered ring containing 3 or 4 carbon atoms, respectively, wherein the additional 2 or 3 carbon atoms may include an $R^3$ substitutent other than hydrogen wherein $R^3$ is lower alkyl or aryl.

The lower alkyl proups represented by the above R groups include straight or branched chain aliphatic hydrocarbon radicals having up to seven carbon atoms, such as methyl, ethyl, propyl, isopropyl, butyl, isobutyl, t-butyl, amyl, hexyl, heptyl, and the like. The lower alkyl groups can include as substituents any of the aryl groups mentioned below.

The term "aryl" includes monocyclic or bicyclic monovalent aromatic ring systems such as phenyl or naphthyl. These aryl radicals can include as substituents halogen, nitro or any of the alkyl groups mentioned herein before.

Where R heterocyclic substituents are present, both $R^1$ and $R^2$ represent the same heterocyclic. Examples of $R^1$ and $R^2$ heterocyclic groups include thienyl, nitro thienyl, furyl, chlorofuryl, pyrryl, pyridyl, thiazolyl, isothiazolyl, imidazolyl, piperazinyl, alkylpiperazinyl and pyrazinyl.

The heterocyclic radical may, if desired, be substituted at a carbon atom with a lower hydrocarbon group such as a lower alkyl radical.

Examples of compounds falling within the present invention include, but are not limited to, those set out in Table A below.

TABLE A

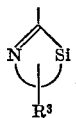

| | $R^1$ | $R^2$ | $R^3$ |
|---|---|---|---|
| 1 | H | H | (thiazole) |
| 2 | H | H | (thiazine) |
| 3 | $C_6H_5$ | $C_6H_5$ | (thiazole) |
| 4 | $C_6H_5$ | $CH_3$ | (thiazine-C6H4-NO2) |
| 5 | $C_6H_5$ | $CH_3S$ | (thiazole-C6H5) |
| 6 | $CO_2C_2H_5$ | H | (thiazine) |
| 7 | $CO_2C_2H_5$ | H | (thiazole) |
| 8 | $C_2H_5S$ | $C_6H_5$ | (thiazine-C6H5) |
| 9 | (furyl) | (furyl) | (thiazole-CH3) |
| 10 | (pyridyl) | (pyridyl) | (thiazine) |
| 11 | (thiazolyl) | (thiazolyl) | (thiazole) |

Compounds of Formula I can be prepared by first converting the triazole (II) into its salt (III) by reacting II with a base such as a metal hydride, such as sodium hydride, Na/liquid ammonia, an alkali metal alkoxide, such as sodium methoxide, potassium ethoxide or sodium t-butoxide or a metal amide such as sodium amide.

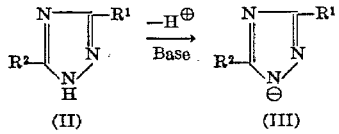

The above reaction can be brought about in a variety of aprotic solvents such as aromatic hydrocarbons, e.g., benzene, toluene or xylene or ethers such as ethyl ether or glyme, at temperatures ranging from about 0° to about 150° for periods of about one hour to twenty-four hours. A slight excess of the base is desirable; thus the ratio of triazole (II) to base can range from about 1:1 to about 1:2.

The salt (III) is reacted with an aliphatic haloalkylisothiocyanate (IV) to yield thiourea (V) which are its tautomer VI undergoes intramolecular alkylation to form the novel triazoles (I).

The above reactions are outlined below.

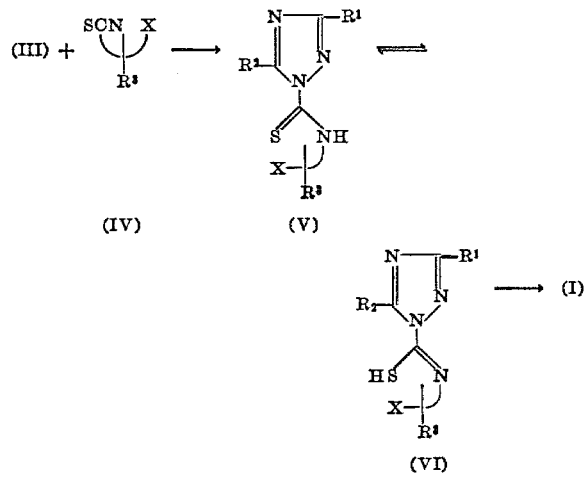

wherein X is Cl or Br.

The ratio of triazole to haloalkylisothiocyanate can range from 1:1 to 1:5. The reaction time can vary from about 1 to about 24 hours. The reaction can be carried out at temperatures ranging from about 35° to about 150°.

The preparation of a variety of triazoles is well documented in Elderfield's Heterocyclic Compounds, vol. 7, John Wiley and Sons, Inc., New York, 1961.

Haloalkylisothiocyanates (IV) are readily synthesized from their corresponding haloalkyl amines (VII) and thiophosgene:

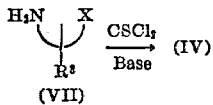

Additional routes toward compounds of structure (IV) are described in Houben-Weyl's Methoden Der Organischen Chemie, vol. 9, G. Thieme Verlay Stuttgart, 1955.

It is to be understood that triazoles containing a free imino hydrogen are virtually tautomeric systems and react like tautomeric mixtures of the two possible forms (A⇌B)

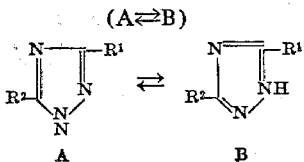

Their reaction products namely the compounds of Formula I of the invention are not necessarily obtained in equal parts but in proportions which differ from compound to compound.

Examples of triazole starting material II which can be employed herein include the following:

TABLE A

|  | $R^1$ | $R^2$ |
|---|---|---|
| 1 | $CH_3$ | H |
| 2 | $C_6H_5$ | H |
| 3 | $C_6H_5CH_2$ | H |
| 4 | $CH_3-\phi-$ | $CH_3-\phi-$ |
| 5 | $C_4H_9$ | $C_4H_9$ |
| 6 | $CH_3OC(O)-$ | H |
| 7 | $CH_3-S-$ | $C_6H_5$ |
| 8 | $C_6H_5$ | H |
| 9 | H | $C_6H_5OC(O)-$ |
| 10 | $NO_2-\phi-$ | $NO_2-\phi-$ |
| 11 | $C_6H_5$ | $SCH_2C_6H_5$ |
| 12 | furyl | furyl |
| 13 | thienyl | thienyl |
| 14 | pyridyl | pyridyl |

Examples of aliphatic haloalkylisothiocyanates which can be employed herein include the following:

$SCN-CH_2CH_2Br$
$SCN-CH_2CH_2CH_2Cl$
$SCN-CH_2CH-Br$
           $|$
           $C_6H_5$ $SCN-CH_2CH-Cl$
           $|$
           $C_6H_4-NO_2$ $SCN-CH_2-CH-CH_2Br$
          $|$
          $CH_3$ $SCN-CH_2CH-Cl$
           $|$
           $CH_3$

The compounds of Formula I form physiologically acceptable acid-addition salts with inorganic and organic acids. These acid-addition salts frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate inorganic acid. Illustrative are the hydrohalides, especially the hydrochloride and hydrobromide which are preferred, sulfate, nitrate, phosphate, oxalate, tartrate, maleate, fumarate, citrate, succinate, methanesulfonate, benzenesulfonate, toluenesulfonate, and the like.

The triazoles described herein have anthelmintic activity and are useful in the treatment and/or prevention of helminthiasis, a parasitic disease which causes widespread and often serious infection in domesticated animals such as swine, horses, cattle, sheep and goats. In treating domesticated animals, the compounds may be mixed with a nontoxic, edible carrier to form a feed supplement which is then incorporated in the animal feed in the desired concentration, or they may be administered in unit dosage forms which, in the case of large domesticated animals, take the form of boluses, or in the form of a liquid drench. Alternatively, water-soluble salts or a dispersable, wettable powder containing the anthelmintic agent may be added to the drinking water of the animals.

The preferred dosage level for treating a helminth infection will depend to a large extent on the particular triazole compound being employed, on the severity of the infection and on the particular species of animal to be treated. In general, the triazoles exhibit anthelmintic activity when administered to animals in a daily dose of about 50 to about 300 mg. per kilogram of animal body weight. It is preferred to employ in the range of 100–200 mg. per kilogram of body weight per day. The compounds may be given in a single dose or divided into a plurality of smaller doses. If desired, the course of treatment may be extended over a period of days in which case the optimum daily dose level may be lowered. When the compounds are to be employed primarily as prophylactic agents for the prevention of helminthic infections, the preferred daily dose level is, of course, lower than the therapeutic level is, preferably in the range of about 10–70 mg. per kilogram of body weight. The triazoles may be incorporated in the animal feeds, and this method of administration is preferred when the compounds are to be used prophylactically, in which case they are incorporated in the feeds at concentrations such that the animal will consume daily from about 10 to about 70 mg. of triazole per kilogram of body weight.

The means employed for administering these triazoles to animals are not critical, and any of the methods now used or available for treating animals infected with or susceptible to parasitic infections are satisfactory. When these substances are employed therapeutically to treat an established infection, they are conveniently administered in a unit dosage form such as in a capsule, bolus, tablet, or as a liquid drench. It will be noted that all of these methods contemplate oral administration, since this is the most effective method of treating the worm-infested stomach or intestinal tract.

When the triazoles are to be administered in unit dosage form, capsules, boluses or drenches containing the desired amount of anthelmintic distributed in a pharmaceutically acceptable vehicle are usually employed. There are prepared by intimately and uniformly mixing the active ingredient with suitable finely divided diluents, suspending agents, fillers, disintegrating agents and/or binders such as starch, lactose, talc, magnesium stearate, vegetable gums and the like. These unit dosage formulations may be widely varied with respect to their total weight and content of anthelmintic agent, depending on factors such as the type of host animal to be treated, the dose level desired, and the severity and type of parasitic infestation. For large animals such as sheep, swine or cattle, boluses weighing up to 15 grams may be used, although it is preferred to employed boluses weighing from 2–10 grams and containing from 1–5 grams of the anthelmintic agent. These boluses, as well as smaller size tablets, contain binders and lubricants, and are compounded by techniques known in this art. Capsules are readily prepared by mixing the active ingredient with a diluent such as starch or lactose and filling into the capsule.

In order to treat infected animals by means of a drench, the triazoles are mixed with a suspending agent such as bentonite and the solid product added to water just prior to administration. The preferred drenches in accordance with this invention contain from about 5–50% by weight of triazole compound.

The triazoles described herein may also be administered as a component of the feed of the animals or dissolved or suspended in the drinking water. According to the invention, novel feed and feed supplement compositions are provided in which compounds of Formula I above are present as an active anthelmintic ingredient. Such compositions comprise the triazoles intimately dispersed in or admixed with an inert carrier or diluent, i.e. one that is nonreactive with respect to the triazole and that may be administered with safety to the animals. The carrier or diluent is preferably one that is or may be an ingredient of the animal ration.

In the feed supplement compositions the active ingredient is present in relatively large amounts. These supplements are suitable for addition to the feed either directly or after an intermediate dilution or blending step. Examples of carriers or diluents suitable for such compositions are solid orally ingestible carriers such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The anthelmintic agents are intimately dispersed or admixed throughout the solid inert carrier by methods such as grinding, stirring, milling, or tumbling. By selecting proper diluents and by altering the ratio of carrier to active ingredient, compositions of any desired concentration may be prepared. Formulations containing from about 5% to about 50% by weight, and preferably from about 10–30% by weight, of active ingredient are particularly suitable for addition to feeds. The active compound is normally dispersed or mixed uniformly in the diluent but in some instances may be sorbed on the carrier.

Feed supplements are prepared by uniformly mixing the appropriate triazole with the carrier or carriers. Such supplements are added to the finished animal feed in an amount adequate to give the final concentration desired for controlling or treating heliminthiasis by way of the animal ration. Although the preferred level in feeds will depend on the particular compound being employed, the anthelmintic compounds of this invention are normally fed at levels of 0.10–2.0% in the feed. One advantageous method of administering the compounds of this invention to animals whose feeds are conveniently pelleted, such as sheep, is to incorporate them directly in the pellets. For instance, triazole is readily incorporated in nutritionally adequate alfalfa pellets (during the pelleting operation) at levels of 0.5 to 5 grams per pound of pellets for therapeutic use, and at lower levels for prophylactic use, and such pellets fed to the worm-infested animals. Alternatively, the triazoles may be incorporated in salt licks or salt blocks at any desired concentration (concentrations of 5–25% by weight are conveniently employed). Large animals such as sheep, cattle and goats, then receive the anthelmintics with their salt.

The following examples further illustrate and repersent preferred embodiments of the invention:

EXAMPLE 1

1-(2-thiazolin-2-yl)-1H-1,2,4-triazole

To a solution of 5.0 g. of 1,2,4-triazole in 125 ml. of dry glyme there is added 3.5 g. of sodium hydride (50% mineral oil dispersion) and the mixture is stirred at room temperature for one hour. Then, there is added 8.4 g. of 2-chloroethylisothiocyanate and the mixture is refluxed for one hour. The solvent is evaporated and water is added to the residue. The resulting solid is filtered off, dried and crystallized from ethyl ether to yield 5.0 g., M.P. 93-95°.

Calcd. for $C_5H_6N_4S$ (percent): C, 38.95; H, 3.92; N, 36.33. Found (percent): C, 38.89; H, 4.15; N, 36.43.

EXAMPLE 2

5,4-dihydro-2(1H-1,2,4-triazol-1-yl)-4H-1,3-thiazine

To a solution of 5 g. of 1,2,4-triazole in 150 ml. of dry glyme, there is added 4.0 g. of sodium hydride (50% mineral oil dispersion). The mixture is stirred at room temperature for two hours after which there is added 3-bromopropyl isothiocyanate and the mixture is refluxed for 1.5 hours. The solvent is removed and water is added to the residue. The resulting oil is extracted with ethyl ether. Evaporation of the solvent furnishes 2 g. of solid which is crystallized from ethyl ether to yield 1.5 g., M.P. 77-79°.

Calcd. for $C_6H_8N_4S$ (percent): C, 42.85; H, 4.79; N, 33.31; S, 19.07. Found (percent): C, 42.69; H, 5.07; N, 33.09; S, 19.20.

EXAMPLES 3 to 20

In accordance with the procedure of the foregoing Examples, substituting the triazole shown in column 1 of Table I below and the aliphatic haloalkylisothiocyanate shown in column 2, the product shown in column 3 is obtained.

TABLE I

| Example number | Column 1 R¹ | R² | Column 2 Haloalkylisothiocyanate | Column 3 R¹ R² | R³ |
|---|---|---|---|---|---|
| 3 | H | H | SCN—CH₂CHCl, C₆H₅ | As in Column 1 | 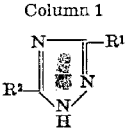 |
| 4 | C₆H₅ | CH₃ | SCN—CH₂—CH₂Br | do | |
| 5 | C₂H₅ | H | SCN—CHCH₂Cl, CH₃ | do | 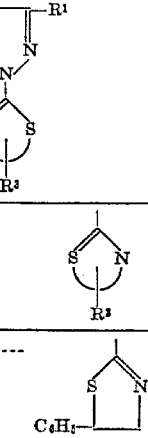 |
| 6 | CH₃ | CH₃ | SCN—CH₂CH₂Cl | do | |
| 7 | C₃H₇S | C₆H₅ | SCN—CH₂CH₂Br | do | Same as above. |
| 8 | C₆H₅OC(O) | H | SCN—CH₂CH₂Cl | do | Do. |
| 9 | C₆H₅C₂H₄— | H | SCN—CHCH₂—Br, C₂H₅ | do | 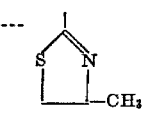 |
| 10 | C₄H₉O— | H | SCN—CH₂CH₂Cl | do | |
| 11 | C₆H₅CH₂ | C₆H₅CH₂ | SCNCH₂CH₂Cl | do | Same as above. |
| 12 | p-C₂H₅—C₆H₄ | CH₃ | SCNCH₂CH₂CH₂Br | do | 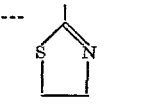 |
| 13 | C₄H₉ | CH₃S | SCNCH₂CH₂CH₂Cl | do | Same as above. |

TABLE I—Continued

| | Column 1 | | | Column 2 | Column 3 | |
|---|---|---|---|---|---|---|
| Example number | R¹ | R³ | Haloalkylisothiocyanate | R¹ R² | R³ | |
| 14 | H | H | SCNCH₂CH₂CHBr<br>                   C₆H₅ | ..do.. | (ring with C₆H₅) | |
| 15 | C₅H₁₁ | H | SCNCH₂CH₂CHCl<br>                   C₆H₅ | ..do.. | Same as above. | |
| 16 | CH₃O—C(=O)— | H | SCNCH₂CH₂CH₂Br | ..do.. | (ring) | |
| 17 | furyl | furyl | SCNCH₂CH₂Cl | ..do.. | (ring) | |
| 18 | pyridyl | H | SCNCH₂CH₂Br | ..do.. | Same as above. | |
| 19 | pyridyl | pyridyl | SCNCH₂CH₂CH₂Cl | ..do.. | (ring) | |
| 20 | thiazolyl | thiazolyl | SCNCH₂CH₂CH₂Br | ..do.. | Same as above. | |

What is claimed is:

1. A compound of the structure:

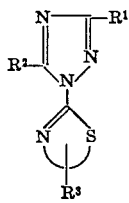

wherein R¹ and R² can be the same or different and are selected from the group consisting of hydrogen; lower alkyl; aryl-lower alkyl; aryl; lower alkylthio; lower alkoxy- or aryloxycarbonyl; halogen; or a heterocyclic radical selected from the group consisting of thienyl, nitro thienyl, furyl, chlorofuryl, pyrryl, pyridyl, thiazolyl, isothiazolyl, imidazolyl, piperazinyl, alkylpiperazinyl and pyrazinyl; R³ is selected from the group consisting of lower alkyl or aryl;

represents a 5 or 6 membered ring; aryl is a mono- or bicarbocyclic aromatic ring system of 6 to 10 carbon atoms; and physiologically acceptable acid-addition salts thereof.

2. A compound as defined in claim 1 having the structure

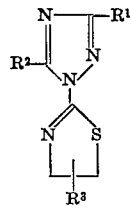

3. A compound as defined in claim 1 having the structure

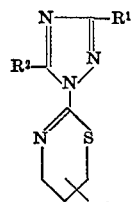

4. A compound as defined in claim 1 having the structure
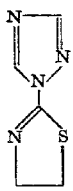
5. A compound as defined in claim 1 having the structure
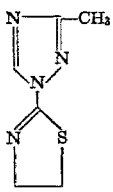
6. A compound as defined in claim 1 having the structure
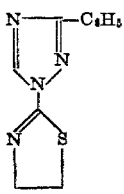
7. A compound as defined in claim 1 having the structure
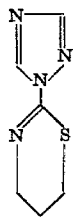
References Cited
UNITED STATES PATENTS
| | | | |
|---|---|---|---|
| 2,577,409 | 12/1951 | Emerson et al. | 260—243 |
| 3,499,083 | 3/1970 | Levitt | 260—243 X |
FOREIGN PATENTS
| | | | |
|---|---|---|---|
| 1,253,002 | 11/1971 | Great Britain | 260—243 |
JOHN M. FORD, Primary Examiner
U.S. Cl. X.R.
260—306.7, 308 R, 296 R; 424—246, 270

UNITED STATES PATENT OFFICE
CERTIFICATE OF CORRECTION

Patent No. 3,767,654                    Dated October 23, 1973

Inventor(s) Rudiger D. Haugwitz, Venkatachala L. Narayanan

It is certified that error appears in the above-identified patent and that said Letters Patent are hereby corrected as shown below:

Column 3, lines 70 to 75, formula A, that portion reading:

" 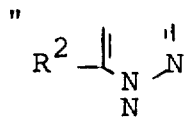 "     should be: -- 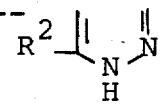 --

Column 5, line 61, "There" should be: -- These --.

Column 9, Table 1, Column 1, that portion of the formula reading:

" 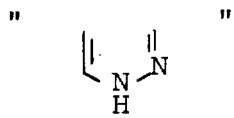 "     should be: -- 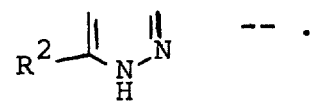 --.

Column 10, Table 1, Column 3, Example 17, that portion of the formula reading:

" 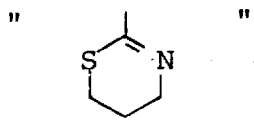 "     should be: -- 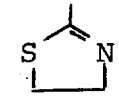 --.

Signed and sealed this 23rd day of April 1974.

(SEAL)
Attest:

EDWARD M.FLETCHER,JR.                C. MARSHALL DANN
Attesting Officer                    Commissioner of Patents